United States Patent [19]

Tuthill, Jr.

[11] Patent Number: 5,027,860

[45] Date of Patent: Jul. 2, 1991

[54] DUAL DIAPHRAGM TANK WITH TELLTALE DRAIN

[75] Inventor: Wallace C. Tuthill, Jr., Seabrook, Tex.

[73] Assignee: The United States of America as represented by the Administrator of the National Aeronautics and Space Administration, Washington, D.C.

[21] Appl. No.: 603,052

[22] Filed: Oct. 25, 1990

[51] Int. Cl.[5] .............................................. F16L 55/04

[52] U.S. Cl. .......................................... 138/30; 138/26

[58] Field of Search .................. 138/26, 30; 220/85 B; 417/540

[56] References Cited

U.S. PATENT DOCUMENTS

| | | | |
|---|---|---|---|
| 356,997 | 2/1887 | Gil | 138/30 |
| 1,809,927 | 6/1931 | Emanueli | 138/30 |
| 2,273,457 | 2/1942 | Zimmerman | 138/30 |
| 2,851,059 | 9/1958 | Lucien | 138/30 |
| 2,875,786 | 3/1959 | Shelly | 138/30 |
| 4,777,982 | 10/1988 | Borowitz et al. | 138/30 |
| 4,784,181 | 11/1988 | Hilverdink | 138/30 |
| 4,796,676 | 1/1989 | Hendershot et al. | 141/83 |
| 4,826,045 | 5/1989 | Price et al. | 222/95 |

FOREIGN PATENT DOCUMENTS

| | | | |
|---|---|---|---|
| 2522380 | 2/1976 | Fed. Rep. of Germany | 138/30 |

*Primary Examiner*—James E. Bryant, III

*Attorney, Agent, or Firm*—Russell E. Schlorff; Harold W. Adams; Edward K. Fein

[57] ABSTRACT

A fluid storage and expulsion system comprising a tank 12 with an internal flexible diaphragm assembly of dual diaphragms 17,18 in back-to-back relationship, at least one of which is provided with a patterned surface having fine edges such that the diaphragms are in contact along said edges without mating contact of surface areas to thereby form fluid channels 27 which extend outwardly to the peripheral edges of the diaphragms. The interior wall of the tank at the juncture of tank sections 14,15 is formed with a circumferential annular recess comprising an outer annular recess portion which forms a fluid collection chamber 40 and an inner annular recess portion which accommodates the peripheral edge portions of the diaphragms and a sealing ring 38 in clamped sealing relation therebetween. The sealing ring is perforated with radially extending passages 39 which allow any fluid leaking or diffusing past a diaphragm to flow through the fluid channels 27 between the diaphragms to the fluid collection chamber. Ports 21,23, connectable to pressure fittings are provided in the tank sections for admission of fluids to opposite sides of the diaphragm assembly. A drain passage 42 through the tank wall to the fluid collection chamber permits detection, analysis and removal of fluids in the collection chamber.

11 Claims, 2 Drawing Sheets

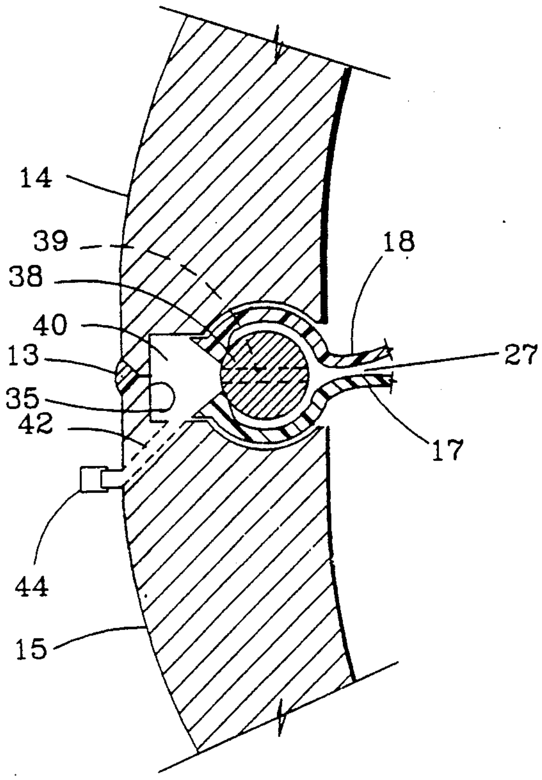
FIG. 3
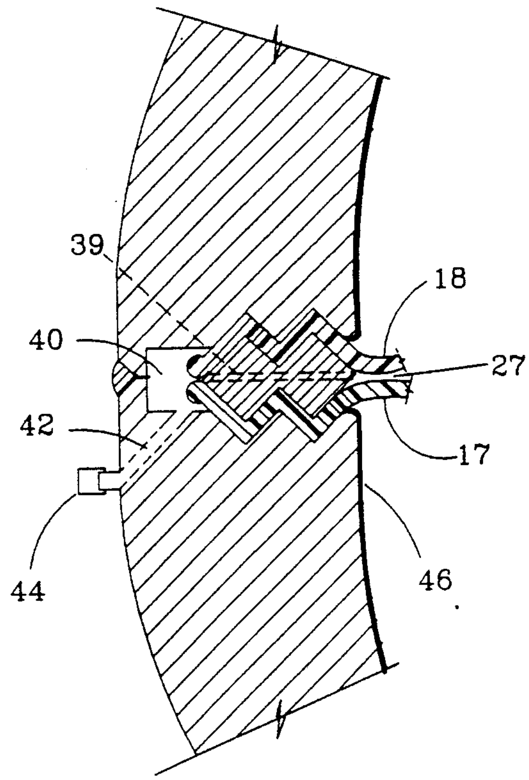
FIG. 4
FIG. 5
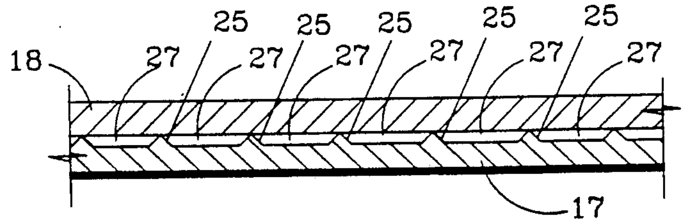
FIG. 6
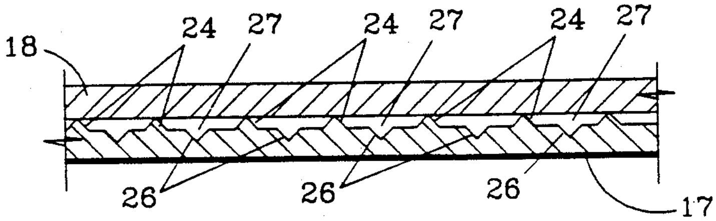
FIG. 7
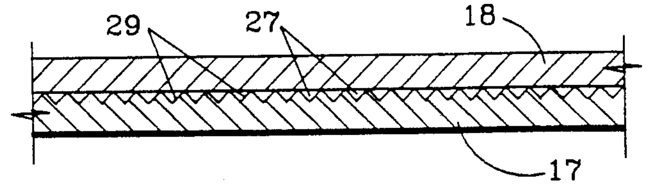

DUAL DIAPHRAGM TANK WITH TELLTALE DRAIN

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to fluid storage and expulsion systems and more particularly to a fluid storage system wherein fluids stored in a tank are separated therein by dual diaphragms arranged in back-to-back relation and having patterned surfaces defining fluid channels for allowing fluid leaking or diffusing through said diaphragms to migrate to a collection chamber provided with a telltale drain.

BACKGROUND OF THE INVENTION

Fluid storage tanks which are provided with an elastic diaphragm therein for the isolated storage of two fluids are well known and have particular application in the aerospace industry where they have been used for the storage and expulsion of a fluid as necessary. Most typically, the tanks are of spherical shape or cylindrical with hemispheric ends and are provided with a single elastic diaphragm fixed within the tank at or near a diametric plane of the tank. The diaphragm may serve to separate a liquid stored in the tank on one side of the diaphragm from a pressurant gas contained on the other side of the tank, although it can be used to separate liquids or gases. When additional pressurant gas is supplied to the tank through an appropriate inlet port, the diaphragm is moved to force fluid on the other side of the diaphragm out of the tank through an appropriate port provided therefor. Other types of fluid storage and expulsion systems include a storage tank with a dual seal piston and cylinder arrangement with a seal-leakage drainage port located between the independent seals.

The prior art systems have many disadvantages. Among the disadvantages of the single-diaphragm tank is the diffusion of one fluid into the other through the diaphragm material. Where gases are used to pressurize liquids in the single-diaphragm tanks, gas diffuses through the diaphragm material and saturates the liquid. Also, the liquid can gradually diffuse through the diaphragm to displace the volume reserved for pressurant gas.

Another disadvantage of a single diaphragm tank is that one failure of the diaphragm allows the direct mixing of the fluids which were to be maintained separate. A further disadvantage associated with spacecraft tanks is the considerable time and effort which must be spent during certification of the tanks for reuse while verifying diaphragm integrity with pressure drop tests. With regard to the piston type accumulators, seal leakage frequently results from piston seal erosion. The gas seals ride on dry cylinder walls and fail relatively quickly.

U.S. Pat. No. 4,784,181 discloses an expansion tank with a two part bladder-type diaphragm wherein liquid is stored in the bladder and pressurized gas is contained in the space between the diaphragm and the housing.

U.S. Pat. No. 4,826,045 discloses a fluid storage and expulsion system designed for aerospace applications which utilizes a single diaphragm with reinforcement rings and guide members for controlled collapsing movement of the diaphragm.

U.S. Pat. No. 4,796,676 discloses a storage tank with a secondary containment bladder. When a vacuum pressure is applied to the tank to mate the tank and bladder, an embossed surface of the bladder provides communication channels for air evacuation during the vacuum phase to reduce buckling and improve the seal between tank and bladder.

It is to be noted that all of the above are basically single-diaphragm tanks and have their attendant disadvantages.

U.S. Pat. No. 4,777,982 discloses a containment vessel with a single diaphragm separating wall composed of two outer layers and a porous middle layer. A leak or diffusion through the outer layers to the inner porous layer is communicated through a porous ring to an outlet. The three layers of the diaphragm limits its flexibility and the use of a clamping ring for connecting the separating wall to the container restricts its usage to low pressure applications.

STATEMENT OF THE INVENTION

The invention is a fluid storage and expulsion system comprising a storage tank formed of two tank portions which are joined along mating edge surfaces in fluid tight relation. The system includes an internal flexible diaphragm assembly which is joined in sealing relation to the tank along the mating edge surfaces of the two tank portions and serves as a separating wall to two fluids introduced to the tanks through ports in said tank portions. The diaphragm assembly comprises dual diaphragms in back-to-back relationship, at least one of which is provided with a patterned surface having fine edges such that the diaphragms are in contact at points along said edges without contact of surface areas therebetween and form fluid channels which extend in an outward direction to the peripheral edges of the diaphragms. Each tank portion is provided with a port for accommodating a fitting whereby a first fluid may be introduced to the tank on one side of the diaphragm assembly and a second fluid introduced to the tank on the other side of the diaphragm assembly. Each tank portion is also provided with an annular groove formed in the mating edge surface thereof to open inwardly of the tank and form with the annular groove of the other tank portion an annular recess comprising an outer annular portion which forms a fluid collection chamber and an inner annular portion which accommodates the peripheral edge portions of said diaphragms and a sealing ring in clamped sealing relation therebetween. The sealing ring is provided with a plurality of radially extending passages whereby when the tank portions are joined together, the radial passages allow any fluid which may have diffused or leaked past a diaphragm to flow outwardly through the fluid channels between the diaphragms to the fluid collection chamber. The collection chamber is provided with a drain passage and a fitting at the outer end of the drain passage for accommodating a removable cap whereby the presence in the collection cavity of the fluids stored in the tank can easily be determined by inspection and would indicate a diaphragm failure. A mixture of fluids would indicate failures of both diaphragms. Any fluids which have leaked or diffused through the diaphragm material can be easily drained away from a tank in service thereby preventing saturation of liquids with the pressurant gas and the displacement of gas volume by liquid diffusion.

BRIEF DESCRIPTION OF THE DRAWINGS

FIG. 3 is an enlarged fragmentary view in radial cross section of the sealed connection of the diaphragms with the wall of the storage tank of the system of FIG. 1;

FIG. 4 is a fragmentary view, similar to FIG. 3 but showing a modified form of sealed connection of the diaphragms with the wall of the storage tank;

FIG. 5 is an enlarged fragmentary view in cross section of the dual diaphragms of the invention in back-to-back relation;

FIG. 6 is an enlarged fragmentary view in cross section of a dual diaphragm assembly which can be used in the invention but showing a modified form of patterned surface on one of the diaphragms; and FIG. 7 is a view similar to FIG. 5 but showing another modified form of patterned surface which can be provided for a diaphragm of the dual diaphragm assembly of the invention.

DETAILED DESCRIPTION OF THE INVENTION

Figure 1:
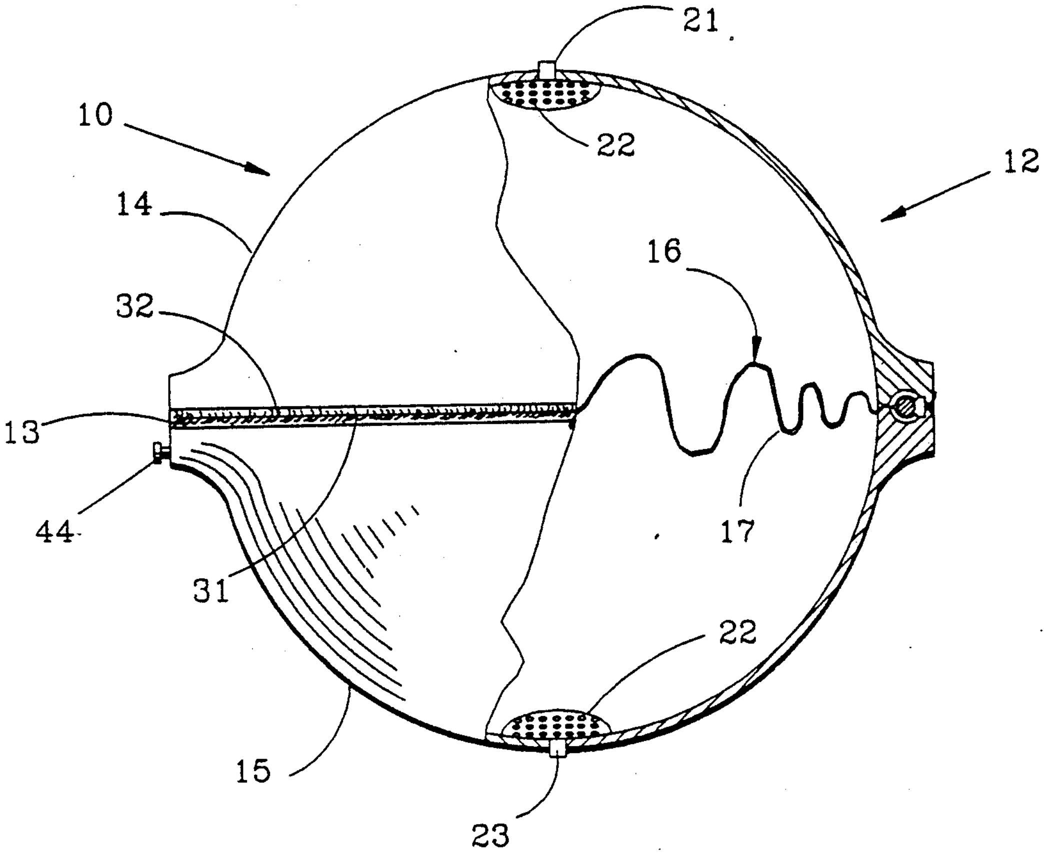
FIG. 1 is a view partly in section of a dual diaphragm-type fluid storage and expulsion system in accordance with the invention.

Referring more particularly to the drawings, there is shown in FIG. 1 a fluid storage and expulsion system 10 which comprises a spherical tank 12 formed of two hemispherical sections 14,15 joined together by an annular weld 13 at their junction in a diametral plane. The system includes a flexible diaphragm assembly 16 of dual flexible diaphragms 17,18 placed in back-to-back relation and joined about their peripheral edge portions to the inner wall of the tank by means of a sealing connection to be hereinafter described. The upper hemispherical tank section 14 is provided with a pressure port 21, which is adapted to be provided with a fitting whereby a fluid, such as a pressurant gas, may be delivered to the tank and contained therein on one side of the flexible diaphragm assembly 16. The lower hemispherical tank section 15 is similarly provided with a port 23 which is adapted to be provided with a fitting whereby a working fluid, such as a liquid fuel, may be delivered to the tank and contained therein on the other side of the flexible diaphragm assembly 16. Both ports have perforated baffles 22 made to prevent extrusion of diaphragms through the port holes during high differential pressures.

The tank 12 may be formed of any suitable material in accordance with intended use. For many aerospace applications, a high strength steel would be appropriate. The diaphragms may be constructed from a wide variety of flexible materials, such as a synthetic rubber or other elastomer, so long as it is compatible with the fluids with which it will be used. The areal extent of the diaphragms should be such as would conform to the interior surface of a hemispherical tank section, as when the tank is filled with a pressurant fluid and the working fluid has been completely eliminated. As shown in FIG. 1, the tank is approximately half-filled with a pressurant gas and the remainder of the tank is filled with a working fluid such as a liquid fuel. Because the areal extent of the diaphragms assembly exceeds the diametral cross section of the tank, folds are present in the diaphragm assembly for any position thereof which is intermediate the positions wherein the diaphragm assembly is in conforming engagement with either of the walls of the hemispherical tank sections.

Figure 2:
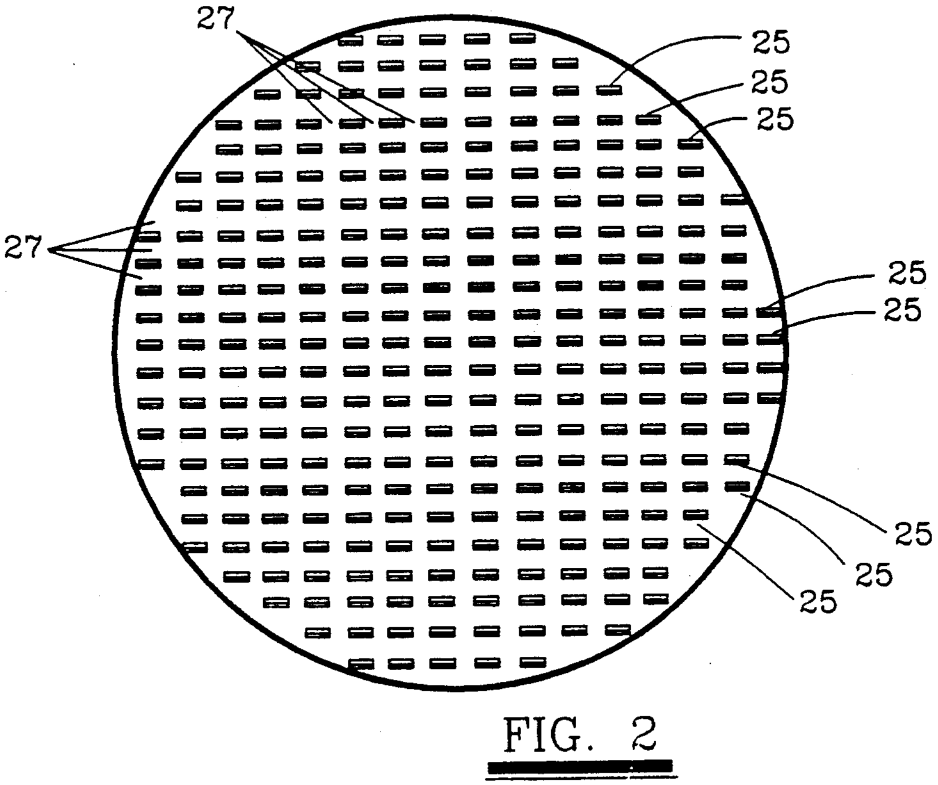
FIG. 2 is a plan view of the patterned surface of one of the diaphragms of the system of FIG. 1 which is placed against a facing surface of the other diaphragm.

The diaphragm 17, shown in FIGS. 2 and 5, is provided with a patterned surface comprising a plurality of ridges 25, each in spaced collinear segments with fine edges. The ridges 25 are shown in parallel array, but it is to be understood they could be random. The diaphragm 18, shown in FIG. 5 is placed in facing contact with the diaphragm 17 and contacts the diaphragm 17 along the edges of ridges 25 without mating contact of surface areas such that the diaphragms and ridges 25 define a plurality of fluid channels 27 which extend outwardly to the peripheral edges of the diaphragms. The diaphragm 18 may also be provided with a patterned surface for contact with ridges 25 of diaphragm 17 or it may be a planar surface. If a patterned surface is provided, it is to be such that the two diaphragms contact only along edges whereby there is no surface areal contact which could establish seals therebetween. Other patterned surfaces which could be provided the diaphragms 17, 18 are shown in cross section in FIGS. 6 and 7 wherein uniformly spaced ridges 24 and grooves 26 may be provided as shown in FIG. 6 or a plurality of adjacent ridges forming a saw tooth configuration 29 of ridges and grooves as shown in FIG. 7. It is important, however, that whatever design is chosen, the fluid channels 27 formed between the diaphragms extend outwardly to the edges of the diaphragm whether in radial or non-radial fashion and that there is no mating contact between the diaphragms as would establish sealed areas.

As shown in FIG. 3, the two tank sections 14, 15 are joined by welding along their diametral edge surfaces 31, 32, as indicated by the annular weld 13. The tank sections could, however, be clamped together with appropriate bolts and clamp flanges, as necessary. Each of the tank sections' edge surfaces is formed with an annular groove 34 which opens toward the interior of the tank and when the tank sections are joined together, forms an annular recess which extends circumferentially around the tank interior at the junction of the tank sections. The annular recess is comprised of an inner annular portion which is designed to accommodate the peripheral edge margins of the diaphragms in a fluid-tight sealing relation therewith when a sealing ring 38 of circular radial cross section is disposed therebetween. For this purpose, the walls of the tank edges which define the inner portion of the annular recess are arcuately grooved in radial cross section so as to grip and retain the diaphragm edge portions and sealing ring 38. The outer portion of the annular recess forms an annular fluid collection chamber 40.

The sealing ring 38 should be formed of the same structural steel as the tank wall to ensure uniform thermal expansion characteristics. During assembly of the system 10 and joining of the tank sections 14, 15 sufficient clamping pressure is applied between the tank sections so that a tight seal is established between the tank sections and the diaphragms. Although the sealing ring 38 establishes seals with the diaphragms 17, 18 it is perforated by a plurality of radially extending passages 39 which establish fluid communication between the fluid channels 27 and the fluid collection chamber 40.

Referring to FIG. 3, it is to be seen that a drain passage 42 extends from the exterior of the tank to the fluid collection chamber 40 and is provided with a removable threaded cap 44. It is also to be seen that the patterned surfaces of the diaphragms, whether on only one or both diaphragms, allows leakage or diffusion of fluids through either diaphragm to migrate and flow outwardly through the channels 27 to the low pressure collection chamber 40 which extends circumferentially about the sealing element 38. The drain 42 allows an inspection of the chamber 40 to detect the presence of the tank fluids which could indicate a failure, such as a tear in the material, of one or both of the diaphragms 17, 18. A fluid mixing would indicate at least two failures, and at least one in each diaphragm. The diffusion of fluids through the diaphragm material can therefore be easily drained away from a tank when in service, thereby preventing saturation of a liquid tank fluid with a pressurant gas or the displacement of gas volume with liquid diffusion.

A modified form of sealing ring, which may be more suitable for particularly high pressure applications, is shown in cross section in FIG. 4. The sealing ring 46, shown therein, is provided with angular surfaces on either side which clamp the diaphragms 17, 18 to similarly configured surfaces provided on the edge surfaces 31, 32 of the tank sections.

It is therefore to be appreciated that a new and improved fluid storage tank and expulsion system is disclosed herein which uses a dual diaphragm arrangement of flexible back-to-back diaphragms for separating one fluid in the tank from another fluid in the tank. The two diaphragms have nonmating surfaces, at least one of which is provided with a pattern of ridges and/or grooves so as to define fluid channels therebetween without any sealed surfaces as would restrict flow therebetween. The pattern may be random or non-random so long as the channels extend to the edges of the diaphragms whereby any leakage fluid will flow to the collection chamber, which may then be inspected or drained as appropriate.

It is also to be understood that the foregoing description of a preferred embodiment of the invention has been presented for purposes of illustration and explanation and is not intended to limit the invention to the precise form disclosed. For example, the tank may have a different shape than described and modified forms of sealing elements may be appropriate for different applications. It is to be appreciated therefore, that various materials and structural changes may be made by those skilled in the art without departing from the spirit of the invention.

We claim:

1. A fluid storage and expulsion system comprising a fluid storage tank formed of two tank portions with mating edge surfaces which are joined along said mating edge surfaces in fluid tight sealing relation;

a diaphragm assembly comprising a pair of flexible diaphragms, at least one of which is provided with a patterned surface placed in contact with a facing surface of the other diaphragm;

said patterned surface having a plurality of ridges with fine edges arranged in a pattern to contact the other diaphragm at points along said edges without contact of surface areas therebetween and to form with said facing surface a plurality of fluid channels which extend outwardly to the peripheral edge portions of said diaphragms;

a sealing ring disposed intermediate said diaphragms and extending therebetween about the peripheral edge portions thereof;

said tank portions each having an annular groove formed in said mating edge surface thereof to open inwardly of the tank portion and form with the annular groove of the other tank portion an annular recess comprising an outer annular recess portion which forms a fluid collection chamber and an inner annular recess portion which accommodates the peripheral edge portions of said diaphragms and said seal ring in clamped sealing relation therebetween, one of said tank portions having a pressure port for the application of a first pressurized fluid to said storage tank on one side of said diaphragm assembly and the other tank portion having a port for the application of a second fluid to said tank on the other side of said diaphragm assembly, said sealing ring having a plurality of radially extending passages disposed to establish fluid communication between said fluid channels and said fluid collection chamber whereby any fluid which diffuses or leaks through either one or both of said diaphragms will flow outwardly to said fluid collection chamber.

2. A fluid storage and expulsion system as set forth in claim 1 further including a fluid drain passage extending from the exterior of said tank to said fluid collection chamber whereby fluids collecting in the collection chamber may be detected and drained therefrom.

3. A fluid storage and expulsion system as set forth in claim 1 wherein both of said diaphragms are provided with patterned surfaces having a plurality of ridges with fine edges and said diaphragms are in contact at points along said edges.

4. A fluid storage and expulsion system as set forth in claim 1 wherein said seal ring is circular in radial cross section.

5. A fluid storage and expulsion system as set forth in claim 1 wherein said seal ring is formed with an annular groove in its upper and lower surfaces which provides the seal ring with a radial cross section having symmetrical upper and lower angular configurations and the walls defining the inner portion of said annular recess are provided with similar conforming angular configurations in radial cross section.

6. A fluid storage and expulsion system comprising a fluid storage tank;

a diaphragm assembly mounted to the interior wall of the tank and comprising a pair of flexible diaphragms, at least one of which is provided with a patterned surface placed in contact with a facing surface of the other diaphragm;

said patterned surface having a plurality of ridges with fine edges arranged in a pattern to contact the other diaphragm at points along said edges without contact of surface areas therebetween and to form with said facing surface a plurality of fluid channels which extend outwardly to the peripheral edges of said diaphragms;

a sealing element disposed intermediate said diaphragms and extending thereabout between the peripheral edge portions of the diaphragms;

said tank wall having an annular groove formed in the interior surface thereof to open inwardly of the tank and form an annular recess comprising an outer annular recess portion which forms a fluid collection chamber and an inner annular recess portion which accommodates the peripheral edge portions of said diaphragms and said seal element in clamped sealing relation therebetween, said tank having a first port for the application of a first pressurized fluid to said storage tank on one side of said diaphragm assembly and a second port for the application of a second fluid to said tank on the other side of said diaphragm assembly, said sealing element having a plurality of radially extending passages disposed to establish fluid communication between said fluid channels and said fluid collection chamber whereby any fluid which diffuses or leaks through either one or both of said diaphragms will flow outwardly to said fluid collection chamber.

7. A fluid storage and expulsion system as set forth in claim 6 further including a fluid drain passage extending from the exterior of said tank to said fluid collection chamber whereby fluids collecting in the collection chamber may be detected and drained therefrom.

8. A fluid storage and expulsion system as set forth in claim 6 wherein both of said diaphragms are provided with patterned surfaces having a plurality of ridges with fine edges and said diaphragms are in contact at points along said edges.

9. A fluid storage and expulsion system as set forth in claim 6 wherein said sealing element is annular in form and circular in radial cross section.

10. A fluid storage and expulsion system as set forth in claim 6 wherein said tank is provided with a liquid and a pressurant gas which are separated by the flexible diaphragm assembly.

11. A fluid storage and expulsion system as set forth in claim 6 wherein said tank is formed of two tank portions with mating edge surfaces which are joined along said mating edge surfaces in fluid right sealing relation established by the clamping of said diaphragms and said sealing element.

* * * * *